No. 765,835. PATENTED JULY 26, 1904.
L. HERZ.
SPRING TIRE.
APPLICATION FILED FEB. 24, 1903.
NO MODEL.
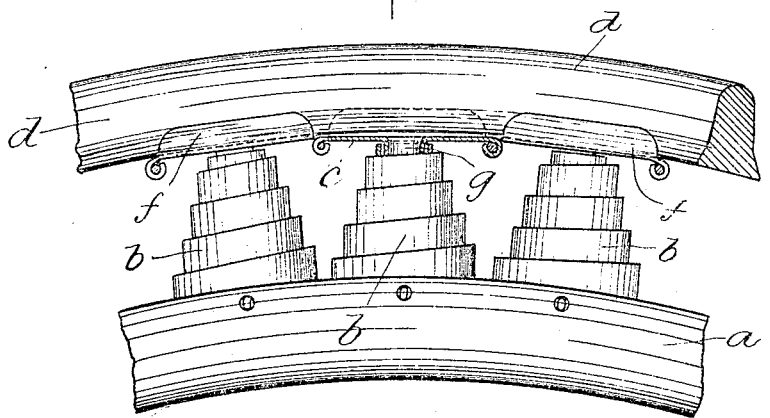
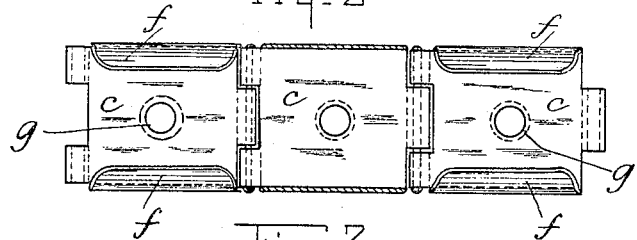
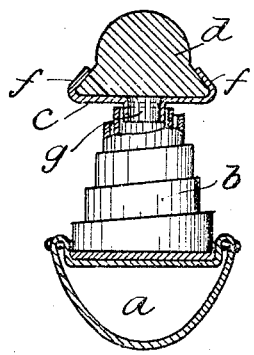
Witnesses:
Inventor:
Ludwig Herz No. 765,835. Patented July 26, 1904.

UNITED STATES PATENT OFFICE.

LUDWIG HERZ, OF FEUCHT, NEAR NUREMBERG, GERMANY.

SPRING-TIRE.

SPECIFICATION forming part of Letters Patent No. 765,835, dated July 26, 1904.

Application filed February 24, 1903. Serial No. 144,822. (No model.)

*To all whom it may concern:*

Be it known that I, LUDWIG HERZ, a subject of the King of Bavaria, and a resident of Feucht, near Nuremberg, Bavaria, Germany, have invented certain new and useful Improvements in Spring-Tires; and I do hereby declare the following to be a full, clear, and exact description of the invention, such as will enable others skilled in the art to which it appertains to make and use the same.

This invention relates to improvements in tires in which helical springs are placed between the wheel-felly and the rim. The principal feature of the invention is the simple attachment of the tire to the rim and of the rim to the helical springs.

The invention is shown in the annexed drawings, in which—

Figure 1 is a side elevation of a portion of such a tire; Fig. 2, a plan view with the tread portion removed, and Fig. 3 a cross-section.

For this purpose a series of metal plates $c$, forming the rim and corresponding in number to the helical springs $b$ on the felly $a$, are pivoted or hinged to each other, so as to form an endless chain. The lateral edges of these plates $c$ are bent inward, so as to form lugs $f$, adapted to inclose and hold fast the tire proper, $d$. At the center of each plate $c$ a small boss $g$ is bent out, or a suitable aperture is made into which a small flanged ring is inserted and fixed. This boss or ring may be made of any suitable material, shape, and size and extends into the central coil of the respective spring $b$, thus preventing the displacement of the tire.

The rim formed in the manner described is very elastic and easy to place on and remove from the separate springs and the unintentional detachment thereof impossible.

What I claim, and desire to secure by Letters Patent, is—

In a spring-tire, the combination of a felly a series of helical springs extending radially from said felly, a rim formed of sectional hinged plates, lugs struck up from said plates and taking into the outer extremities of said springs and an elastic tire proper engaging said plates, substantially as described.

In testimony whereof I affix my signature in presence of two witnesses.

LUDWIG HERZ.

Witnesses:
C. WIELE,
MAX SCHNEIDER.